May 27, 1924.
A. R. DUTES
UNIVERSAL JOINT
Filed May 17, 1923
1,495,633
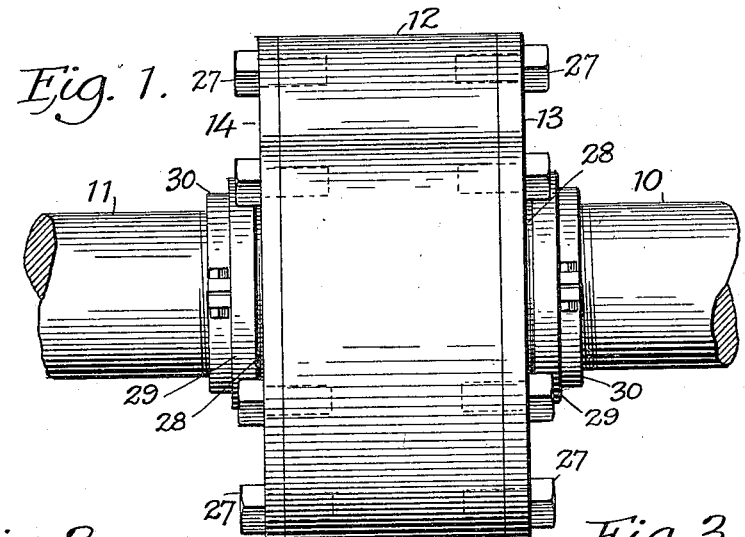
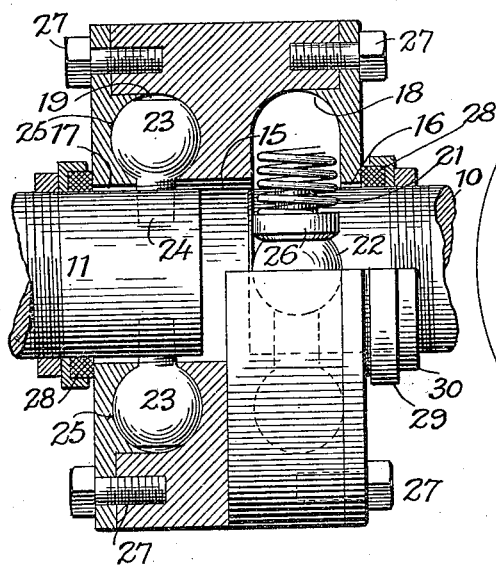
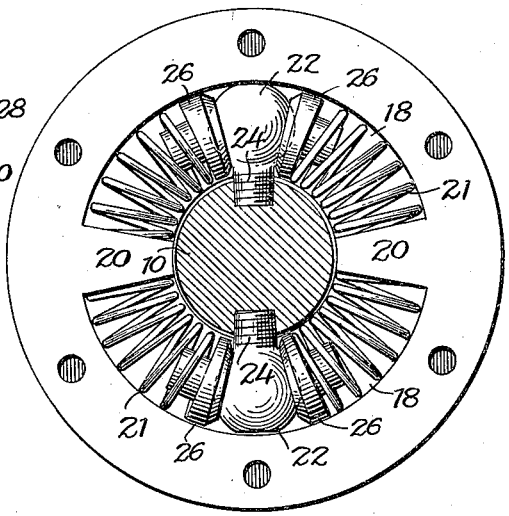
Inventor
A. R. Dutes,
By Thomas R. Furney
Attorney Patented May 27, 1924.

1,495,633

UNITED STATES PATENT OFFICE.

ALBERT R. DUTES, OF CHARLESTON, SOUTH CAROLINA.

UNIVERSAL JOINT.

Application filed May 17, 1923. Serial No. 639,572.

*To all whom it may concern:*

Be it known that I, ALBERT R. DUTES, a citizen of the Republic of France, residing at Charleston, in the county of Charleston and State of South Carolina, have invented certain new and useful Improvements in Universal Joints, of which the following is a specification.

My present invention relates generally to universal joints and more particularly to a universal joint applicable to machinery such as for instance the driving mechanism of an automobile or motor car where for better protection and greater durability of the motor, clutch and transmission elements some means capable of taking up the shocks between the transmission mechanism and the driven wheels as the result of letting in the clutch is a great consideration and constitutes the moving reason and the primary object of my invention which is the provision of a universal joint having therein means to absorb torque shocks in operation.

In the accompanying drawing which illustrates the preferred embodiment of my invention and which forms a part of this specification, Figure 1 is a side elevation of my improved universal joint, Figure 2 is a vertical longitudinal section taken centrally therethrough, and Figure 3 is a vertical transverse section taken adjacent to one side, with the adjacent side plate of the housing removed.

Referring now to these figures my invention proposes a universal joint of that type wherein the driving and driven shafts 10 and 11 are in endwise adjacent relation and move in operation but slightly out of the axial line which may be common to both, my invention contemplating the extension of the adjacent ends of these shafts into opposite sides of a casing of the body 12 and side plates 13 and 14 of which have central openings 15, 16 and 17 of sufficiently greater diameter than the driving and driven shafts to permit of the necessary deflection of the latter.

For the purpose of my invention the body 10 of the casing has within its opposite sides around the inner ends of the shafts 10 and 11 and at the opposite ends of its central bore 15 pairs of arcuate rounded grooves 18 and 19 of which the grooves of each pair are separated at their ends by webs 20 which form integral parts of the body 12 of the casing and which serve as abutments for the outer ends of coil springs 21 disposed within each of the several grooves upon opposite sides of pins 22 and 23 respectively carried by the driving and driven shafts 10 and 11, the pins 22 of driving shaft 10 radially outstanding from this shaft at right angles to the outward extension of the pins 23 from the driven shaft 11 and the pins of each shaft being diametrically opposed.

Each of the several pins 22 and 23 has a threaded shank 24 screwing into a radial bore of its respective shaft and each pin has a rounded outer portion in one of the pairs of grooves 18 and 19, with which latter grooves the inner grooved faces 25 of the side plates 13 and 14 of the casing cooperate to form channels snugly interfitting by the rounded outer portions of the pins 22 and 23 as well as spring bearing blocks 26 disposed at opposite sides of each of the pins 22 and 23 and between the same and the inner ends of the shock absorbing springs 21.

The side plates 13 and 14 are secured around their peripheral portions to the body 12 of the casing by an annular series of connecting bolts 27, disconnection of the bolts of each side plate admitting of ready removal of such side plate so that easy access can thus be had to the interior of the casing.

Around the shafts 10 and 11 and abutting the side plates 13 and 14 of the casing so as to close the outer ends of the central openings 16 and 17 of these side plates are packing rings 28, confined by flanged follower rings 29 the latter in turn adjustably held by split locking rings 30 threaded on portions of the shafts, it being thus obvious that inasmuch as the packing rings 28 rotate with the shafts and with the casing, leakage of oil or lubricant from the casing, a disadvantage to which the usual universal joint is subject, can be easily prevented.

It is obvious from the foregoing that the springs 21 are capable of absorbing torque shocks in use and that the device as a whole is not only simple and inexpensive both as to first cost and upkeep, but is compact, strong and durable as well.

I claim:

1. A universal joint for driving and driven shafts in endwise adjacent relation, including a housing consisting of a body portion and side plates secured to the body portion having axial openings of greater diameter than the shafts, said body portion having arcuate side grooves in pairs around the opposite ends of its opening and having the integral portions thereof between the ends of the grooves of each pair forming abutments, diametrical pins outstanding from each of the shafts and into the grooves at one side of said casing body, the pins of the two shafts being in right angular relationship, springs disposed in the grooves upon opposite sides of said pins and between the latter and the said abutments of the casing body, said side plates of the casing having inner grooved faces coacting with the grooves of the body to form channels in which the pins are movable against the springs, and packing rings disposed around the shafts against the side plates to cover the openings of the side plates.

2. A universal joint for driving and driven shafts in endwise adjacent relation, including a housing consisting of a body portion and side plates secured to the body portion having axial openings of greater diameter than the shafts, said body portion having arcuate side grooves in pairs around the opposite ends of its opening and having the integral portions thereof between the ends of the grooves of each pair forming abutments, diametrical pins outstanding from each of the shafts and into the grooves at one side of said casing body, the pins of the two shafts being in right angular relationship, springs disposed in the grooves upon opposite sides of said pins and between the latter and the said abutments of the casing body, said side plates of the casing having inner grooved faces coacting with the grooves of the body to form channels in which the pins are movable against the springs, and packing rings disposed around the shafts against the side plates to cover the openings of the side plates, and means adjustable on the shafts to hold the packing rings in place whereby the said side plates may be removed to permit access to the body of the casing as described.

In testimony whereof I have affixed my signature.

ALBERT R. DUTES.